(12) United States Patent
Uehara

(10) Patent No.: US 11,045,980 B2
(45) Date of Patent: Jun. 29, 2021

(54) METHOD FOR MOLDING COMPOSITE MATERIALS

(71) Applicant: Nissan Motor Co., Ltd., Yokohama (JP)

(72) Inventor: Shigetaka Uehara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/494,325

(22) PCT Filed: Apr. 10, 2017

(86) PCT No.: PCT/JP2017/014715
§ 371 (c)(1),
(2) Date: Sep. 16, 2019

(87) PCT Pub. No.: WO2018/189794
PCT Pub. Date: Oct. 18, 2018

(65) Prior Publication Data
US 2020/0009766 A1    Jan. 9, 2020

(51) Int. Cl.
| | |
|---|---|
| *B29C 35/08* | (2006.01) |
| *B29C 70/20* | (2006.01) |
| *B29C 70/46* | (2006.01) |
| *B29K 101/10* | (2006.01) |
| *B29K 307/04* | (2006.01) |

(52) U.S. Cl.
CPC .......... *B29C 35/0805* (2013.01); *B29C 70/20* (2013.01); *B29C 70/46* (2013.01); *B29K 2101/10* (2013.01); *B29K 2307/04* (2013.01)

(58) Field of Classification Search
CPC ..... B29C 35/0805; B29C 70/20; B29C 70/46; B29C 2035/0822; B29K 2101/10; B29K 2307/04
USPC .......................................................... 264/494
See application file for complete search history.

(56) References Cited

U.S. PATENT DOCUMENTS

| | | | | |
|---|---|---|---|---|
| 4,892,764 A | * | 1/1990 | Drain ...................... | B29C 35/02 156/161 |
| 5,407,610 A | * | 4/1995 | Kohama ................. | B29C 51/14 264/236 |
| 6,446,933 B1 | * | 9/2002 | Westmoreland ........ | B29C 33/56 106/38.27 |

FOREIGN PATENT DOCUMENTS

| | | |
|---|---|---|
| CN | 102216074 A | 10/2011 |
| DE | 10 2015 114 397 A1 | 3/2017 |
| EP | 2 915 645 A1 | 9/2015 |
| GB | 2 241 194 A | 8/1991 |

(Continued)

*Primary Examiner* — Matthew J Daniels
*Assistant Examiner* — Gregory Chad Grosso
(74) *Attorney, Agent, or Firm* — Global IP Counselors, LLP

(57) ABSTRACT

A molding method is provided for molding composite materials. The molding method molds a stack of composite materials formed by impregnating a base material with resin. The molding method includes providing a first resin with a photocuring property and providing a second resin with a thermosetting property. The first resin contained in a first composite material is cured by irradiating the first composite material with light, then the second resin is cured by heating the second resin contained in a second composite material. The curing of the first resin contained in the first composite material is completed before starting the curing of the second resin contained the second composite material that is adjacent to the first composite material of a surface layer.

11 Claims, 6 Drawing Sheets

(56) References Cited

FOREIGN PATENT DOCUMENTS

| | | |
|---|---|---|
| JP | 56-106826 A | 8/1981 |
| JP | H03-293105 A | 12/1991 |
| JP | 5-131477 A | 5/1993 |
| JP | 5-329988 A | 12/1993 |
| JP | H06-79795 A | 3/1994 |
| JP | H06-166110 A | 6/1994 |
| JP | 2000-272021 A | 10/2000 |
| JP | 2003-1657 A | 1/2003 |
| JP | 2014-124901 A | 7/2014 |
| JP | 2014-173053 A | 9/2014 |
| WO | 2013/110111 A1 | 8/2013 |
| WO | 2016/003983 A1 | 1/2016 |

* cited by examiner

S11

S12

S13

S14

S15

S16

S14

S15

METHOD FOR MOLDING COMPOSITE MATERIALS

CROSS-REFERENCE TO RELATED APPLICATIONS

This application is a U.S. national stage application of International Application No. PCT/JP2017/014715, filed on Apr. 10, 2017.

BACKGROUND

Technical Field

The present invention relates to a method for molding composite materials.

Background Information

A technique in which a composite material (prepreg), made by impregnating a base material (carbon fibers) with resin, is stacked and then thermoformed to produce a molded article such as disclosed in Japanese Laid-Open Patent Application No. 2014-173053 (refer to Patent Document 1). In the technique disclosed in Patent Document 1, the surface roughness of the base material is reduced, and the binding property of the base material is improved by means of a sizing treatment, in order to suppress disturbance of the base material.

SUMMARY

In the technique disclosed in Patent Document 1, because the resin that is impregnated in the base material still flows during thermoforming, which generates a disturbance in the base material, it is difficult to sufficiently suppress an unevenness in the surface of the stacked composite material. That is, it is difficult to produce a good appearance with the technique disclosed in Patent Document 1.

An object of the present invention is to provide a molding method for composite materials with which it is possible to produce a good appearance.

In order to realize the object described above, the molding method for composite materials according to the present invention is a method in which a composite material, made by impregnating a base material with resin, is stacked and molded. In this molding method for composite materials, the curing of a first resin contained in a first composite material is completed before starting the curing of a second resin contained in a second composite material that is adjacent to the first composite material of the surface layer.

DETAILED DESCRIPTION OF THE EMBODIMENTS

Figure 1:
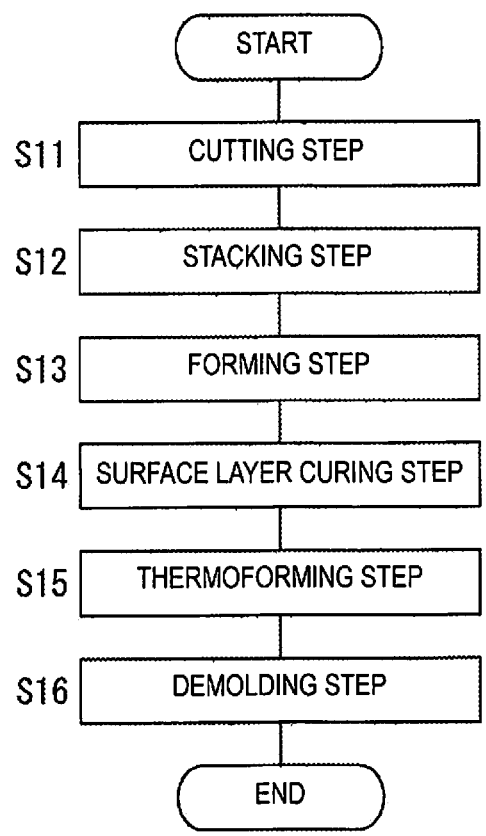
FIG. 1 is a flowchart illustrating a molding method for composite materials according to a first embodiment.

First and second embodiments of the present invention will be described below with reference to the appended drawings. In the drawings, the same members have been assigned the same reference symbols and redundant explanations have been omitted. In the drawings, the sizes and proportions of the members have been exaggerated for ease of understanding the first and second embodiments and may differ from the actual sizes and proportions.

First Embodiment

Figure 3:
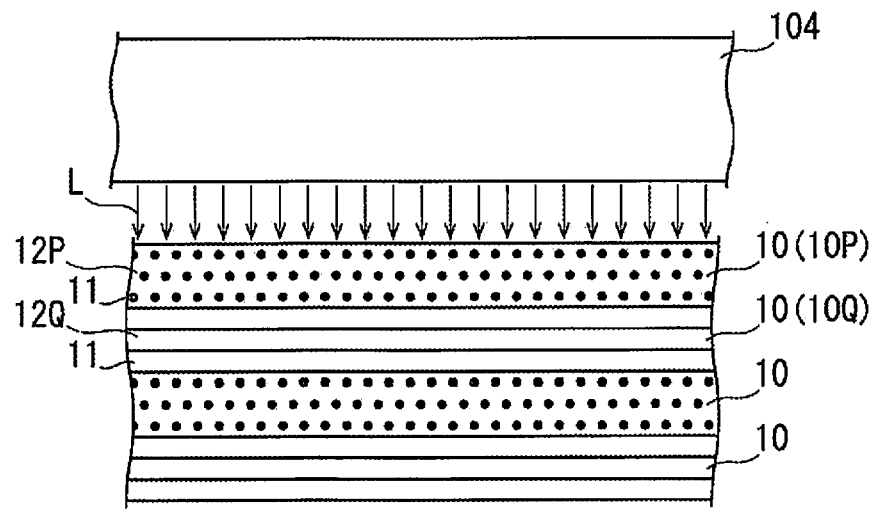
FIG. 3 is a schematic view, related to the surface layer curing step shown in FIG. 2D, illustrating a state in which the resin (matrix resin) of the prepreg sheet of the surface layer, from among the plurality of prepreg sheets, is photocured.

With reference to FIG. 3: in general, a molding method for composite materials (prepreg sheet 10) according to a first embodiment is a method in which the prepreg sheet 10, made by impregnating a base material (carbon fibers 11) with resin (matrix resin 12), is stacked and molded. In this method for molding the prepreg sheet 10, the curing of a first matrix resin 12P contained in a first prepreg sheet 10P is completed before starting the curing of a second matrix resin 12Q contained in a second prepreg sheet 10Q that is adjacent to the first prepreg sheet 10P of the surface layer.

Here, the first prepreg sheet 10P of the surface layer corresponds to all of the prepreg sheets 10 except the one layer of the prepreg sheet 10 on the back surface (backmost layer). That is, of a plurality of prepreg sheets 10 that are stacked, the first prepreg sheet 10P of the surface layer may be only one layer (frontmost layer) that is exposed to the outside on the surface side, or a plurality of layers excluding one layer (backmost layer) that is exposed to the outside on the back surface side.

Prepreg Sheet 10

The prepreg sheet 10 (composite material) is made by impregnating the base material (carbon fibers 11) with the resin (matrix resin 12), which is then formed into a long, thin plate shape. A molded article 20 made of carbon fiber reinforced plastic (CFRP) is formed using the prepreg sheet 10.

The base material is not limited to carbon fibers 11 and may be made of glass fibers, organic fibers, or the like. The carbon fibers 11 have a more uniform fiber orientation by using long fibers that are oriented in one direction, compared to a case in which short fibers having a random fiber orientation are used. That is, wrinkles, twists, and irregularities caused by disturbance in the fibers are suppressed by using long carbon fibers 11.

The matrix resin 12 is composed of, for example, epoxy resin having photocuring and thermosetting properties, or acrylic or urethane resin having photocuring and thermosetting properties. With respect to the matrix resin 12, it is sufficient if, of the plurality of prepreg sheets 10 that are stacked, at least the first prepreg sheet 10P, which is on the outermost surface and exposed to the outside, has photocuring properties.

Method for Molding the Prepreg Sheet 10

The method for molding the prepreg sheet 10 is embodied by the following steps. That is, the method for molding the prepreg sheet 10 is embodied by a cutting Step S11, in which a long prepreg sheet 10 is cut into individual pieces; a stacking Step S12, in which the individual pieces of the prepreg sheet 10 are stacked; and a forming Step S13 in which the plurality of stacked prepreg sheets 10 are preformed. In addition, the method for molding the prepreg sheet 10 is embodied by a surface layer curing Step S14, in which the first prepreg sheet 10P of the surface layer of the preformed plurality of prepreg sheets 10 is cured; a thermoforming Step S15, in which the entirety of the plurality of prepreg sheets 10, only the surface layer of which has been cured, is thermally cured; and a demolding step S16, in which the thermally cured plurality of prepreg sheets 10 (molded article 20) are removed from the die.

The method for molding the prepreg sheet 10 (embodied by the cutting Step S11 to the demolding Step S16) will be described with reference to FIGS. 1 and 2A to 2F. FIG. 1 is a flow chart illustrating the method for molding the prepreg sheet 10. FIGS. 2A to 2F are schematic views illustrating the method for molding the prepreg sheet 10.

Cutting Step S11

Figure 2A:
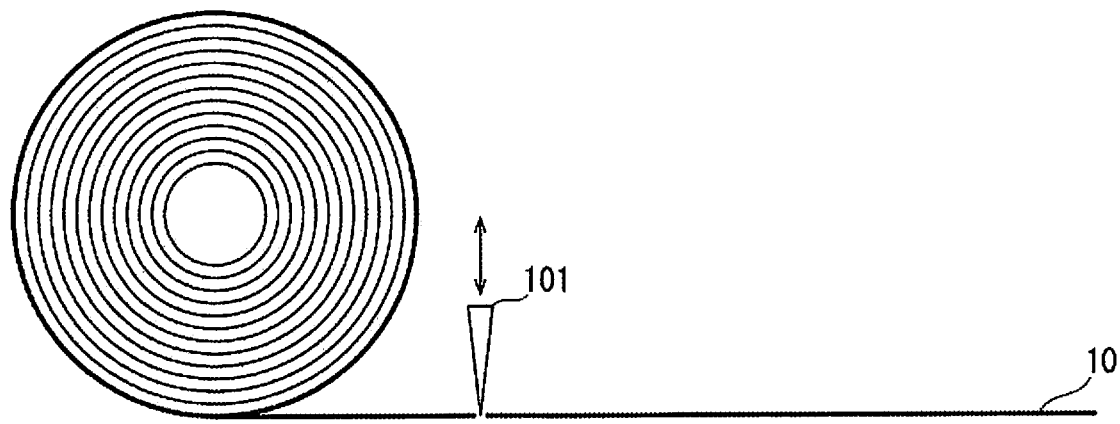
FIG. 2A is a schematic view of the molding method for composite materials, corresponding to a cutting step, illustrating a state in which a wound, long prepreg sheet is stretched and cut into individual pieces at set intervals.

As shown in FIG. 2A, the cutting Step S11 is a step for cutting the long prepreg sheet 10 into individual pieces.

FIG. 2A is a schematic view corresponding to the cutting Step S11, illustrating a state in which the wound, long prepreg sheet 10 is stretched and cut into individual pieces at set intervals.

As shown in FIG. 2A, the wound, long prepreg sheet 10 is stretched and cut into individual pieces with a cutting blade 101 at set intervals. The individual pieces of the prepreg sheet 10 are conveyed to the stacking Step S12.

Stacking Step S12

Figure 2B:
FIG. 2B is a schematic view, corresponding to a stacking step following the state of FIG. 2A, illustrating a state in which the individual pieces of the prepreg sheet are stacked.

As shown in FIG. 2B, the stacking Step S12 is a step for stacking the individual pieces of the prepreg sheet 10.

FIG. 2B is a schematic view, corresponding to the stacking Step S12 following the state of FIG. 2A, illustrating a state in which the individual pieces of the prepreg sheet 10 are stacked.

As shown in FIG. 2B, a plurality of the individual pieces of the prepreg sheet 10 are stacked. Depending on the thickness of the molded article 20, several to several tens of the prepreg sheets 10 are stacked in a stretched state so as not to form wrinkles.

Forming Step S13

Figure 2C:
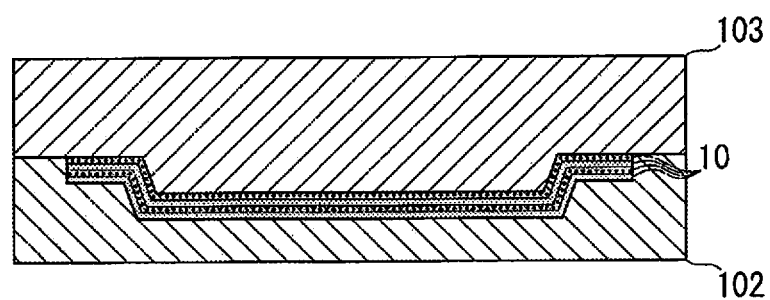
FIG. 2C is a schematic view, corresponding to a forming step following the state of FIG. 2B, illustrating a state in which the plurality of stacked prepreg sheets are preformed to match the outer shape of the molded article.

As shown in FIG. 2C, the forming Step S13 is a step for preforming the plurality of stacked prepreg sheets 10.

FIG. 2C is a schematic view, corresponding to the forming Step S13, following the state of FIG. 2B, illustrating a state in which the plurality of stacked prepreg sheets 10 are preformed to match the outer shape of the molded article 20.

As shown in FIG. 2C, the plurality of stacked prepreg sheets 10 are preformed by means of a preforming die (stationary forming die 102 and movable forming die 103). The stationary forming die 102 and the movable forming die 103 correspond to the main shape of the molded article 20. The movable forming die 103 is raised and the plurality of prepreg sheets 10 are placed on the stationary forming die 102, after which the movable forming die 103 is lowered. The plurality of prepreg sheets 10 are sandwiched and clamped with the stationary forming die 102 and the movable forming die 103.

Surface Layer Curing Step S14

Figure 2D:
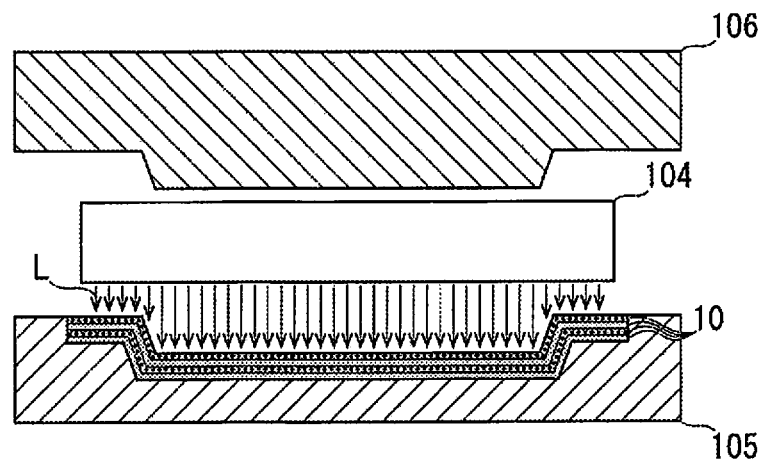
FIG. 2D is a schematic view, corresponding to a surface layer curing step following the state of FIG. 2C, illustrating a state in which light is irradiated on the surface of the preformed plurality of prepreg sheets to cure the prepreg sheet of the surface layer.

As shown in FIGS. 2D and 3, the surface layer curing Step S14 is a step for curing the first prepreg sheet 10P of the surface layer of the preformed plurality of prepreg sheets 10.

FIG. 2D is a schematic view, corresponding to the surface layer curing Step S14 following the state of FIG. 2C, illustrating a state in which light L is irradiated on the surface of the preformed plurality of prepreg sheets 10 to cure the first prepreg sheet 10P of the surface layer. FIG. 3 is a schematic view, relating to the surface layer curing Step S14 shown in FIG. 2D, illustrating a state in which the resin (matrix resin 12) of the first prepreg sheet 10P of the surface layer, from among the plurality of prepreg sheets 10, is photocured.

As shown in FIGS. 2D and 3, the movable forming die 103 is separated from the stationary forming die 102, and a light source 104 is brought opposite the plurality of prepreg sheets 10 that are held by the stationary forming die 102. The light source 104 is composed of a lamp, a light-emitting diode, or a laser diode that emits light L containing ultraviolet light. The light source 104 is attached to a linear moving stage (not shown) so as to approach and separate from the preforming die (the stationary forming die 102 and the movable forming die 103). The light L is irradiated from the light source 104 onto the surfaces of the plurality of prepreg sheets 10. As shown in FIG. 3, of the plurality of stacked prepreg sheets 10, at least the first matrix resin 12P contained in the first prepreg sheet 10P, which is on the outermost surface and exposed to the outside, is cured by means of the light L.

The curing of the first matrix resin 12P in the surface layer curing Step S14 includes, in addition to a state in which the curing is completed, a state in which the curing has not been completed but has progressed to a hardness that maintains a certain degree of shape retention.

Thermoforming Step S15

Figure 2E:
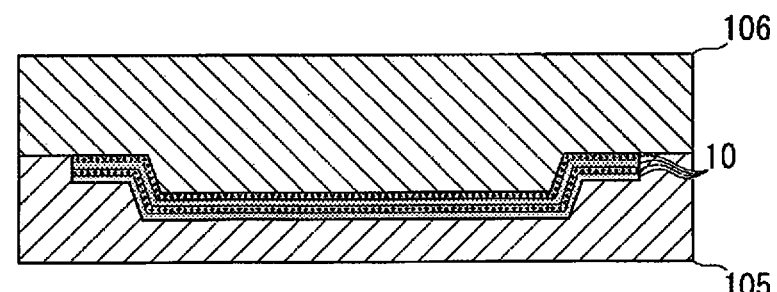
FIG. 2E is a schematic view, corresponding to a thermoforming step following the state of FIG. 2D, illustrating, in a state with only the surface layer cured, the thermally curing of the plurality of prepreg sheets.
Figure 4:
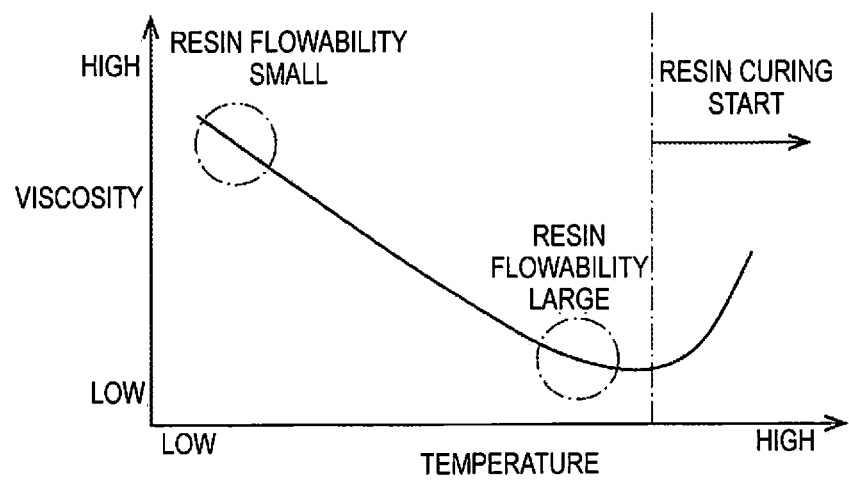
FIG. 4 is a schematic view, related to the thermoforming step shown in FIG. 2E, illustrating the relationship between the viscosity and temperature of the resin (matrix resin) of the prepreg sheet.

As shown in FIGS. 2E and 4, the thermoforming Step S15 is a step for thermally curing the plurality of prepreg sheets 10, of which only the surface layer has been cured.

FIG. 2E is a schematic view, corresponding to the thermoforming Step S15 following the state of FIG. 2D, illustrating a state in which the plurality of prepreg sheets 10, of which only the surface layer has been cured, are thermally cured. FIG. 4 is a schematic view, relating to thermoforming Step S15 shown in FIG. 2E, illustrating the relationship between the viscosity and temperature of the resin (matrix resin 12) of the prepreg sheet 10.

As shown in FIG. 2E, the plurality of prepreg sheets 10 that have been preformed are molded with a molding die (stationary thermoforming die 105 and movable thermoforming die 106). At least one of the stationary thermoforming die 105 and the movable thermoforming die 106 has an incorporated heater for heating. The stationary thermoforming die 105 and the movable thermoforming die 106 correspond to the shape of the molded article 20. The movable thermoforming die 106 is raised and the plurality of prepreg sheets 10 that have been preformed are placed on the stationary thermoforming die 105, after which the movable thermoforming die 106 is lowered. The plurality of prepreg sheets 10 that have been preformed are sandwiched and clamped with the stationary thermoforming die 105 and the movable thermoforming die 106.

As shown in FIG. 4, when heat is input to the plurality of stacked prepreg sheets 10 and the temperature is raised, the viscosity of the matrix resin 12 temporarily decreases and starts to flow before curing. Here, of the plurality of stacked prepreg sheets 10, curing of the first prepreg sheet 10P of the surface layer has already been promoted in the surface layer curing Step S14. Accordingly, with respect to the surfaces of the plurality of stacked prepreg sheets 10, there is not an extreme decrease in the viscosity of the matrix resin 12 even when heat is input, so that it is possible to suppress the flowing of the matrix resin 12. That is, with respect to the surfaces of the plurality of stacked prepreg sheets 10, the orientation of the carbon fibers 11 will not be disturbed even if heat is input, so that it is possible to suppress wrinkles, twists, irregularities, and localized shrinkage caused by disturbing the fibers. Accordingly, the surfaces of the plurality of stacked prepreg sheets 10 can maintain a good appearance.

Of the plurality of stacked prepreg sheets 10, the prepreg sheets 10 other than the first prepreg sheet 10P of the surface layer have not been irradiated with the light L in the surface layer curing Step S14. That is, in the prepreg sheets 10 other than the first prepreg sheet 10P of the surface layer, the impregnated matrix resin 12 starts to flow as heat is input in the thermoforming Step S15. Accordingly, in the prepreg sheets 10 other than the first prepreg sheet 10P of the surface layer, the matrix resin 12 also flows into minute gaps in the adjacent prepreg sheets 10 in a low-viscosity state, thereby enhancing the impregnating ability. Therefore, in the plurality of stacked prepreg sheets 10, it is possible to prevent a reduction in the durability and a decrease in the peeling strength caused by voids and the like, while maintaining a good appearance.

Demolding Step S16

Figure 2F:
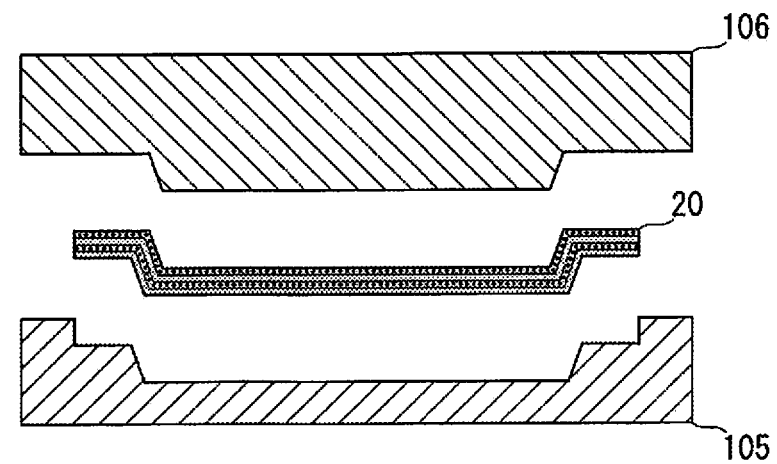
FIG. 2F is a schematic view, corresponding to a demolding step, following the state of FIG. 2E, illustrating a state in which the thermally cured plurality of prepreg sheets (molded article) are removed from the stationary die and the movable die.

As shown in FIG. 2F, the demolding Step S16 is a step for removing the thermally cured plurality of prepreg sheets 10 (molded article 20) from the molding die.

FIG. 2F is a schematic view corresponding to the demolding Step S16, following the state of FIG. 2E, illustrating a state in which the thermally cured plurality of prepreg sheets 10 (molded article 20) are removed from the stationary thermoforming die 105 and the movable thermoforming die 106.

As shown in FIG. 2F, the thermally cured plurality of prepreg sheets 10 (molded article 20) are cooled to room temperature, after which the movable thermoforming die 106 is separated from the stationary thermoforming die 105, to take out the molded article 20. Thereafter, if necessary, the outer edge of the molded article 20 is cut with a cutting blade to finish (trimming step). In addition, the molded article 20 is painted (painting step).

The action and effects of the above-described first embodiment will now be described.

The method for molding the prepreg sheet 10 is a method in which the prepreg sheet 10, which is made by impregnating the base material (carbon fibers 11) with resin (matrix resin 12), is stacked and molded. In this method for molding the prepreg sheet 10, the curing of the first matrix resin 12P contained in the first prepreg sheet 10P is completed before starting the curing of the second matrix resin 12Q contained in the second prepreg sheet 10Q that is adjacent to the first prepreg sheet 10P of the surface layer.

According to the method for molding the prepreg sheet 10, of the stacked prepreg sheets 10, the first matrix resin 12P of the first prepreg sheet 10P of the surface layer is cured, after which the second matrix resin 12Q of the second prepreg sheet 10Q inside is cured. That is, when the stacked prepreg sheets 10 are cured, even if the viscosity of the matrix resin 12 impregnated in the carbon fibers 11 is reduced and the resin flows inside the stacked prepreg sheets 10, it is possible to sufficiently suppress the influence of the resin on the surfaces of the stacked prepreg sheets 10. Therefore, according to the method for molding the prepreg sheet 10, it is possible to obtain a good appearance.

In the method for molding the prepreg sheet 10, the second matrix resin 12Q to be used preferably has a thermosetting property.

According to the method for molding the prepreg sheet 10, molding can be carried out by using the second matrix resin 12Q that has a thermosetting property, which is highly versatile and whose curing can be easily controlled.

In the method for molding the prepreg sheet 10, the first matrix resin 12P preferably has a photocuring property, and the first matrix resin 12P is preferably cured by irradiating the light L to the first prepreg sheet 10P.

According to the method for molding the prepreg sheet 10, if the first matrix resin 12P of the first prepreg sheet 10P is to be partially cured, it is possible to irradiate the light L onto the necessary part (area) in order to selectively cure the first matrix resin 12P of the necessary part (area). In addition, if the first matrix resin 12P is to be partially cured, it is also possible to mask the parts other than the necessary part (area) with a reflective sheet, or the like, and to irradiate the entire first prepreg sheet 10P with the light L in order to selectively cure the first matrix resin 12P of the necessary part (area). Therefore, according to the method for molding the prepreg sheet 10, it is possible to select the necessary part (area) to obtain a good appearance.

Moreover, according to the method for molding the prepreg sheet 10, the light L enters the first prepreg sheet 10P and is absorbed by the first prepreg sheet 10P. That is, it is possible to suppress the light L from reaching (entering) the second prepreg sheet 10Q positioned immediately below the first prepreg sheet 10P and curing the second matrix resin 12Q of the second prepreg sheet 10Q. Since an interface is generated between the first prepreg sheet 10P and the second prepreg sheet 10Q, even if the light L were emitted from the first prepreg sheet 10P, it is possible to make it difficult for the light to enter the second prepreg sheet 10Q. Accordingly, of the plurality of stacked prepreg sheets 10, it is possible to selectively cure the first matrix resin 12P of the first prepreg sheet 10P positioned in the outermost layer. Therefore, according to the method for molding the prepreg sheet 10, it is possible to select the necessary part (area) to obtain a good appearance.

In the method for molding the prepreg sheet 10, the first matrix resin 12P preferably has a photocuring property with respect to ultraviolet light, and the first matrix resin 12P is preferably cured by irradiating the light L containing ultraviolet light onto the first prepreg sheet 10P.

According to the method for molding the prepreg sheet 10, it is possible to efficiently cure the first prepreg sheet 10P by using ultraviolet light L, which has a relatively short wavelength and high energy. Therefore, according to the method for molding the prepreg sheet 10, it is possible to obtain a good appearance.

Moreover, according to the method for molding the prepreg sheet 10, it is possible to sufficiently attenuate the light L inside the first prepreg sheet 10P by using the ultraviolet light L, which has a relatively short wavelength and high energy. That is, it is possible to suppress the light L from reaching (entering) the second prepreg sheet 10Q positioned immediately below the first prepreg sheet 10P and curing the second matrix resin 12Q of the second prepreg sheet 10Q. Accordingly, of the plurality of stacked prepreg sheets 10, it is possible to selectively cure the first matrix resin 12P of the first prepreg sheet 10P positioned in the outermost layer. Therefore, according to the method for molding the prepreg sheet 10, it is possible to obtain a good appearance.

In the method for molding the prepreg sheet 10, the base material preferably includes a plurality of the carbon fibers 11 that are oriented in one direction.

According to the method for molding the prepreg sheet 10, it is possible to suppress irregularities on the surface of the prepreg sheet 10, compared with a case of using a base material that includes carbon fibers that are configured as a woven fabric in which the orientations are orthogonal to each other. Therefore, according to the method for molding the prepreg sheet 10, it is possible to obtain a good appearance. Typically, when the plurality of carbon fibers 11 that are oriented in one direction are used, there is the concern that the binding force in the direction of orientation of the fibers is weak and that even a slight flow of the resin will easily disturb the orientation; however, as in the first embodiment, after the first matrix resin 12P of the first prepreg sheet 10P of the surface layer is cured, it is possible to eliminate the aforementioned concern by curing the second matrix resin 12Q within the second prepreg sheet 10Q.

Second Embodiment

Figure 5:
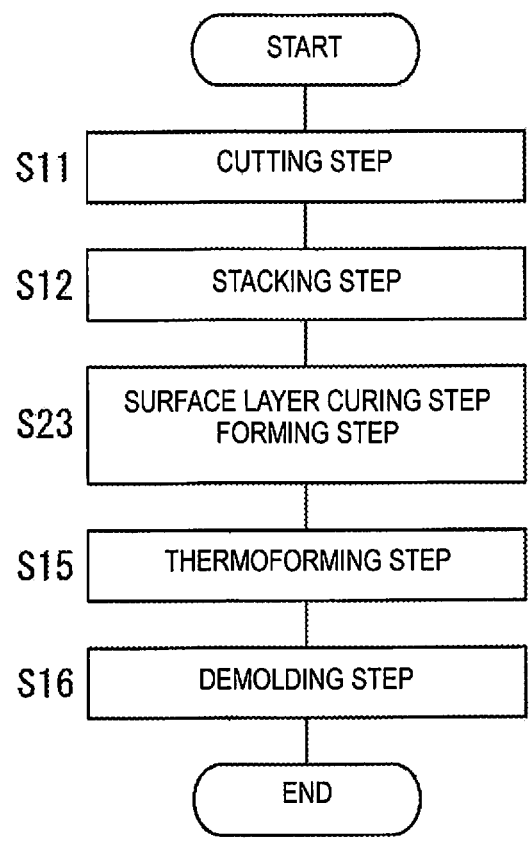
FIG. 5 is a flowchart illustrating a molding method for composite materials according to a second embodiment.

The method for molding the prepreg sheet 10 according to the second embodiment differs from the method for molding the prepreg sheet 10 according to the first embodiment above in that the surface layer curing step and the forming step are carried out together (surface layer curing step and forming Step S23), as illustrated in FIG. 5. In the first embodiment described above, the surface layer curing Step S14 is carried out after the forming Step S13 and before the thermoforming Step S15.

The method for molding the prepreg sheet 10 according to the second embodiment will be described with reference to FIG. 5 (flow chart of the second embodiment), FIG. 6 (embodiment 2-1), and FIG. 7 (embodiment 2-2).

In the second embodiment, when the plurality of stacked prepreg sheets 10 are preformed by means of a preforming die (stationary forming die 102 and movable forming die 203 or 303), the light L is irradiated from the light source 104 onto the plurality of stacked prepreg sheets 10. That is, the surface layer curing step and the forming step are carried out simultaneously.

Embodiment 2-1

FIG. 5 is a flowchart illustrating the method for molding the prepreg sheet 10 according to the second embodiment. FIG. 6 is a schematic view, corresponding to the surface layer curing step and forming Step S23 according to the embodiment 2-1, illustrating a state in which the plurality of prepreg sheets 10 are irradiated with the light L, which is transmitted through the movable forming die 203, in order to cure the prepreg sheet 10P of the surface layer.

Figure 6:
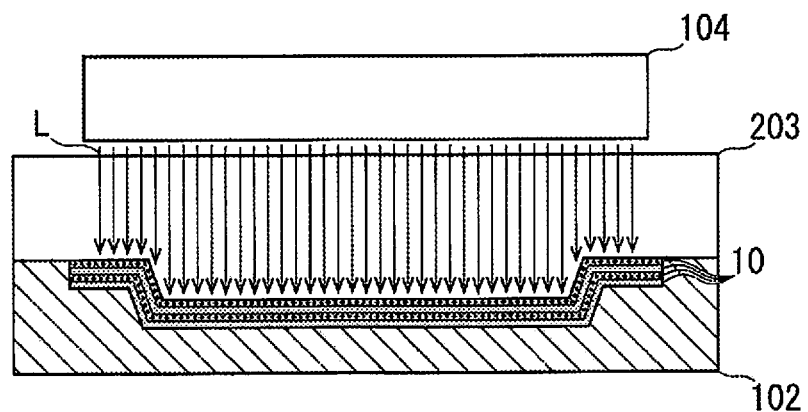
FIG. 6 is a schematic view, corresponding to a surface layer curing step and a forming step according to embodiment 2-1, illustrating a state in which a plurality of prepreg sheets are irradiated with light transmitted through a movable forming die in order to cure the prepreg sheet of the surface layer.

As shown in FIG. 6, the movable forming die 203 has the same outer shape as the movable forming die 103 of the first embodiment, but the material is glass, such as synthetic quartz, which has heat resistance and transmits ultraviolet light. The movable forming die 203 is not limited to synthetic quartz, as long as the material has heat resistance and transmits ultraviolet light. The light source 104 is disposed at the rear of the movable forming die 203. The light L that is emitted from the light source 104 is transmitted through the movable forming die 103 and irradiated onto the plurality of stacked prepreg sheets 10.

Embodiment 2-2

Figure 7:
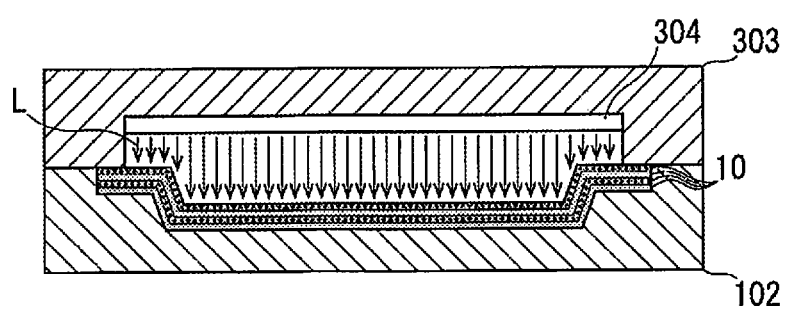
FIG. 7 is a schematic view, corresponding to a surface layer curing step and a forming step according to embodiment 2-2, illustrating a state in which a plurality of prepreg sheets are irradiated with light from the interior of the movable forming die in order to cure the prepreg sheet of the surface layer.

FIG. 7 is a schematic view, corresponding to the surface layer curing step and forming Step S23 according to the embodiment 2-2, illustrating a state in which the plurality of prepreg sheets 10 are irradiated with the light L from inside the movable forming die 303, in order to cure the first prepreg sheet 10P of the surface layer.

As shown in FIG. 7, the movable forming die 303 has the same outer shape as the movable forming die 103 of the first embodiment, but has a light source 304 in a portion facing the stationary forming die 102. Moreover, the portion of the movable forming die 303 that transmits the light L emitted from the light source 304 to the outside is made of glass, such as synthetic quartz. The light source 304 is configured from a light-emitting diode or a laser diode. The light L that is emitted from the light source 304 is irradiated onto the plurality of stacked prepreg sheets 10.

The action and effects of the above-described second embodiment will now be described.

In the method for molding the prepreg sheet 10, it is preferable to carry out thermoforming after concurrently forming and irradiating the stacked prepreg sheets 10 with light.

According to the method for molding the prepreg sheet 10, it is possible to carry out thermoforming after forming the stacked prepreg sheets 10 while curing the surface layer in order to increase rigidity. That is, when the stacked prepreg sheets 10 are moved from the forming step to the thermoforming step, it is possible to maintain the shape and ensure the positioning accuracy. Therefore, according to the method for molding the prepreg sheet 10, it is possible to obtain a good appearance by eliminating the influence of the movement from the forming step to the thermoforming step and any effect on the positioning accuracy during the thermoforming step.

Moreover, according to the method for molding the prepreg sheet 10, in the forming step which does not include heating, it is possible to irradiate the first prepreg sheet 10P with the light L and to efficiently cure only the first matrix resin 12P, so that the influence of heat is eliminated. Therefore, according to the method for molding the prepreg sheet 10, it is possible to eliminate the influence of heat and to obtain a good appearance.

In the method for molding the prepreg sheet 10, the molding of the stacked prepreg sheets 10 takes place by pressing the movable forming die 203 or the movable forming die 303, which corresponds to the outer shape of the molded article 20, against the stacked prepreg sheets; it is preferred that the movable forming die 203 or the movable forming die 303 transmit the light L toward the stacked prepreg sheets 10.

According to the method for molding the prepreg sheet 10, it is possible to cure the prepreg sheet 10 of the surface layer in a state in which the stacked prepreg sheets 10 are pressed (restrained) by the movable forming die 203 or the movable forming die 303. That is, the stacked prepreg sheets 10 have good transferability of the shape of the movable forming die 203 or the movable forming die 303. Therefore, according to the method for molding the prepreg sheet 10, it is possible to obtain a good appearance in which the shape of the movable forming die 203 or the movable forming die 303 is transferred.

Other than the foregoing, various modifications to the present invention based on the configurations described in the Claims are possible, which also belong in the scope of the present invention.

In the first embodiment and the second embodiment, the first prepreg sheet 10P of the surface layer is irradiated with ultraviolet light and cured in the surface layer curing step, but visible light or infrared light, which has a longer wavelength than ultraviolet light, may be irradiated in order to carry out curing.

In the first embodiment and the second embodiment, the carbon fibers 11 of the prepreg sheet 10 that are used are oriented in one direction, but the carbon fibers may be alternately woven. In this case, alternately woven carbon fibers 11 may be used for the prepreg sheets 10 other than the first prepreg sheet 10P of the surface layer.

In the first embodiment, the surface layer curing Step S14 is carried in the die (stationary forming die 102 and movable forming die 103) of the forming Step S13 after the completion of the forming Step S13. However, the surface layer curing Step S14 may be carried out in the die (stationary thermoforming die 105 and movable thermoforming die 106) of the thermoforming Step S15 before starting the thermoforming Step S15.

In the second embodiment, in the surface layer curing step and forming Step S23, the stationary forming die 102, instead of the movable forming die 103, may be formed from synthetic quartz, for example, and the surfaces of the stacked prepreg sheets 10 irradiated with the light L that is transmitted through the stationary forming die 102.

In the surface layer curing step of the second embodiment, the movable thermoforming die 106 or the stationary thermoforming die 105 may be formed from synthetic quartz, for example, and the surface of the stacked prepreg sheets 10 irradiated with the light L that is transmitted through the movable thermoforming die 106 or the stationary thermoforming die 105. That is, the surface layer curing step of the second embodiment may be carried out simultaneously with the thermoforming Step S15 of the first embodiment.

In the first embodiment and the second embodiment, the matrix resin 12 (resin) that is used has a thermosetting property, but a resin having thermoplasticity may be used as well.

The invention claimed is:

1. A molding method for molding a stack of composite materials formed by impregnating a base material with resin, the molding method comprising:
   providing a surface layer that includes a first composite material comprising a first resin impregnated in a first base material, the first resin having a photocuring property;
   providing a second layer adjacent to the surface layer that includes a second composite material comprising a second resin impregnated in a second base material, the second resin having a thermosetting property;
   curing the first resin contained in the first composite material by irradiating the first composite material with light, then curing the second resin by heating the second resin contained in the second composite material; and
   completing the curing of the first resin contained in the surface layer before starting the curing of the second resin contained in the second layer,
   the surface layer being an outermost layer of the stack of composite materials that is exposed to an outside of the stack of composite materials during curing of the first resin contained in the first composite material.

2. The molding method according to claim 1, wherein the curing of the first resin comprises irradiating the first composite material with ultraviolet light.

3. The molding method according to claim 1, wherein at least one of the first base material and the second base material contains a plurality of carbon fibers that are oriented in one direction.

4. The molding method according to claim 1, wherein the stack of the composite materials is irradiated with light and shaped, and then thermoformed.

5. The molding method according claim 1, further comprising
   pressing a die corresponding to an outer shape of an article to be molded against the stack of the composite materials, wherein
   the die transmits the light toward the stack of the composite materials.

6. The molding method according to claim 2, wherein at least one of the first base material and the second base material contains a plurality of carbon fibers that are oriented in one direction.

7. The molding method according to claim 2, wherein the stack of the composite materials is irradiated with light and shaped, and then thermoformed.

8. The molding method according to claim 3, wherein the stack of the composite materials is irradiated with light and shaped, and then thermoformed.

9. The molding method according to claim 2, further comprising
   pressing a die corresponding to an outer shape of an article to be molded against the stack of the composite materials, wherein
   the die transmits the light toward the stack of the composite materials.

10. The molding method according to claim 3, further comprising
    pressing a die corresponding to an outer shape of an article to be molded against the stack of the composite materials, wherein
    the die transmits the light toward the stack of the composite materials.

11. The molding method according claim 4, further comprising
pressing a die corresponding to an outer shape of an article to be molded against the stack of the composite materials, wherein
the die transmits the light toward the stack of the composite materials.

* * * * *